Figure 6:
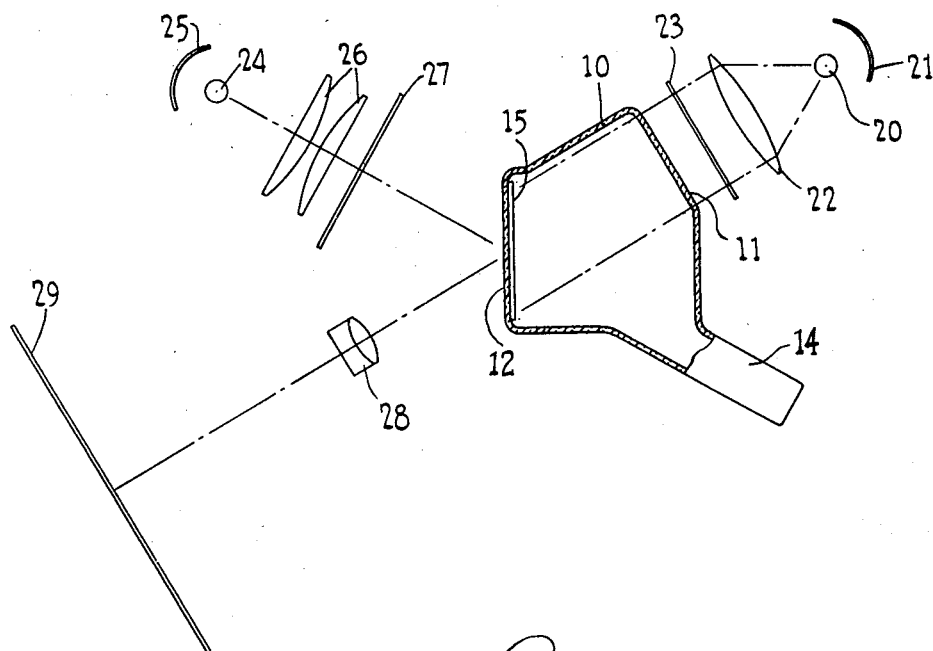

Sept. 13, 1949.                    A. H. ROSENTHAL                    2,481,622
          CATHODE-RAY TUBE WITH PHOTO-DICHROIC IONIC
                  CRYSTAL LIGHT MODULATING SCREEN
Filed June 6, 1945                                           3 Sheets-Sheet 1
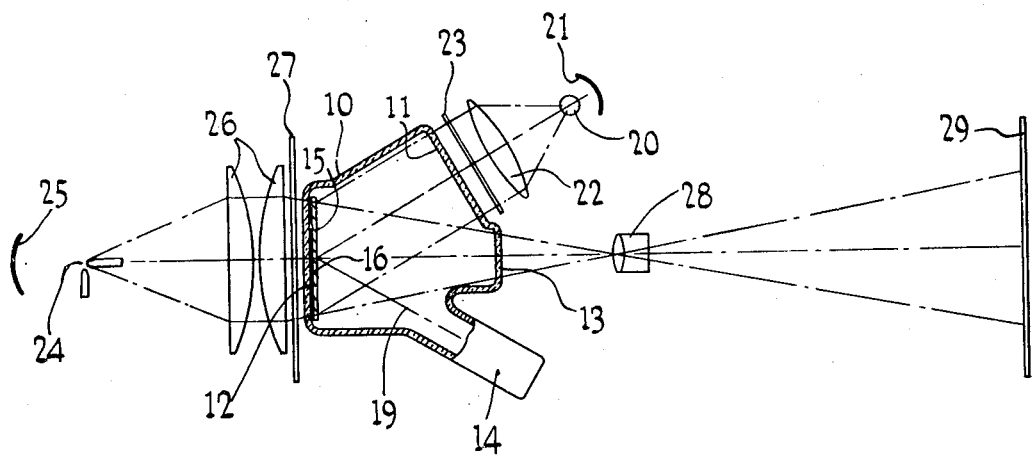
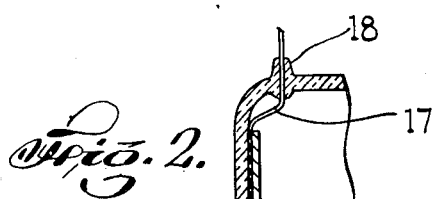
INVENTOR.
ADOLPH H. ROSENTHAL
BY
J. O. Ollier,
ATTORNEY

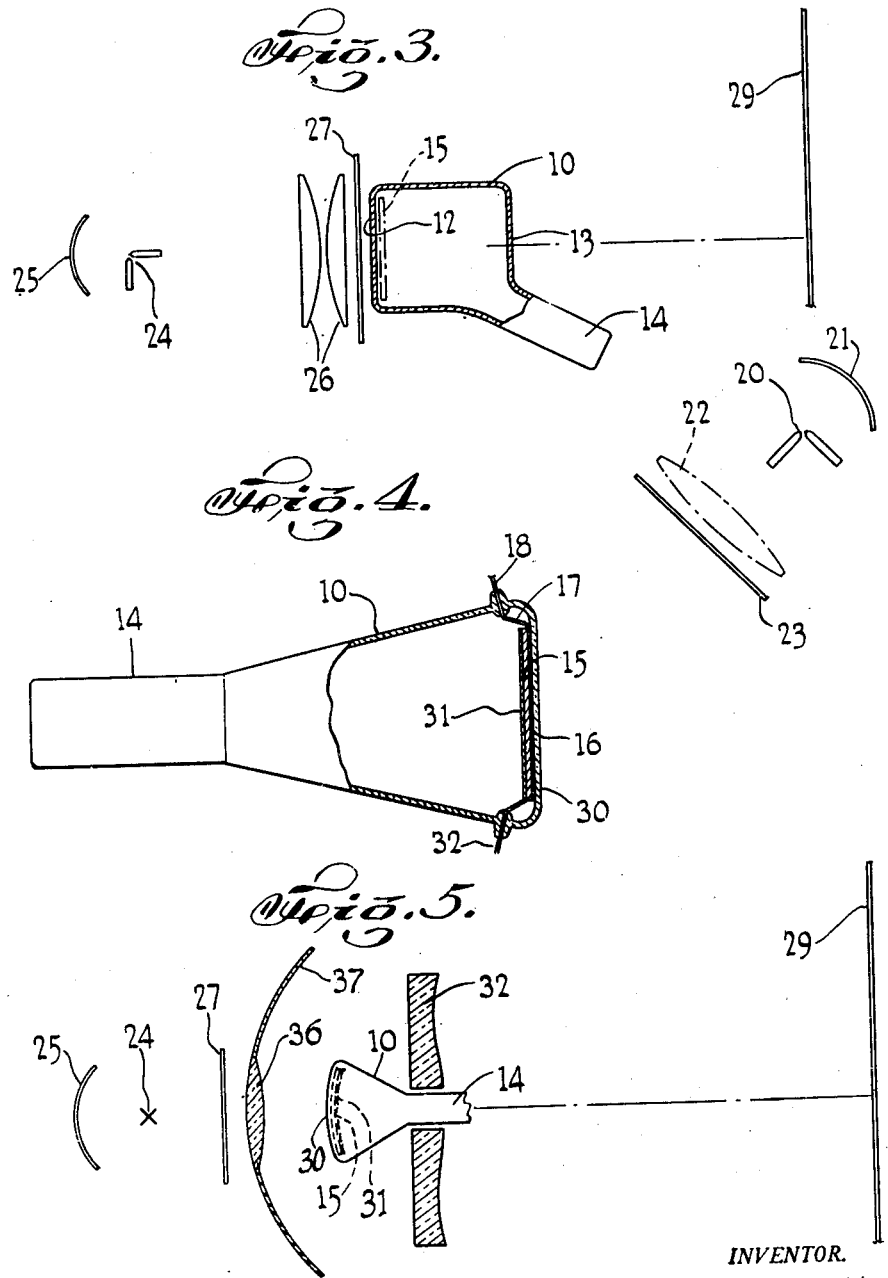

Sept. 13, 1949.  A. H. ROSENTHAL  2,481,622
CATHODE-RAY TUBE WITH PHOTO-DICHROIC IONIC
CRYSTAL LIGHT MODULATING SCREEN
Filed June 6, 1945  3 Sheets-Sheet 3

INVENTOR
ADOLPH H. ROSENTHAL
BY
ATTORNEY

Patented Sept. 13, 1949

2,481,622

UNITED STATES PATENT OFFICE 2,481,622

CATHODE-RAY TUBE WITH PHOTO-DICHROIC IONIC CRYSTAL LIGHT MODULATING SCREEN

Adolph H. Rosenthal, New York, N. Y., assignor, by mesne assignments, to Skiatron Corporation, New York, N. Y., a corporation of New York Application June 6, 1945, Serial No. 597,775

8 Claims. (Cl. 178—7.5)

1

This invention relates to a cathode ray controlled light valve or direct-view reproducer, including a screen essentially comprising ionic crystal material of the type as disclosed, for instance, in my Patent No. 2,330,171, for the visible reproduction of intelligence of any kind modulated or impressed upon a cathode ray beam or stream, and particularly for television reproducers.

It has been observed that ionic crystal material of the type in which color or opacity centers are created by the injection of electrons, exhibit photo-dichroism. This means that upon illumination of the material thus excited by polarized light, internal changes occur therein which cause it to act as a partial polarizer upon incident light of suitable wavelengths, and to absorb one of the two resulting polarized components of that light more strongly than another. If the crystal material be of proper thickness, one of the components can be practically extinguished by absorption whereas the other one is transmitted in appreciable amount.

The degree of polarization and absorption of the incident light obtainable by this photo-dichroic material at a given instant is substantially dependent (1) on the instantaneous intensity of the polarized light causing dichroism and (2) the number of color centers simultaneously created in the material by the incident cathode ray beam or stream.

According to the invention, this property of ionic crystal material of the type herein concerned and in particular of certain alkali halides, earth alkaline halides and mixtures or solid solutions thereof, is utilized for a cathode ray controlled light valve. This will be more clearly understood when the specification proceeds with reference to the drawings in which Fig. 1 shows in vertical cross-section and rather schematically a typical arrangement according to the invention using a projection screen, Fig. 2 in cross-section and on larger scale a portion of the light valve tube exemplified in Fig. 1, Fig. 3 a modified arrangement, Fig. 4 a direct view arrangement, Fig. 5 a projection arrangement using a Schmidt aspherical lens system, and Figs. 6 and 7 other projection arrangements according to the invention.

An evacuated glass envelope 10, Fig. 1, is provided with three substantially plane wall portions or windows 11, 12 and 13, and an oblique neck 14. In the latter a conventional electron gun is provided (not shown), including in well known manner a heated cathode, modulating, focusing and accelerating electrodes for the electron stream or beam emitted by the cathode, and deflecting electrodes or electro-magnetic coils for directing the developed and focused electron beam or pencil upon desired areas of a screen layer 15 inside window 12.

Screen layer 15, Figs. 1 and 2, essentially consists of ionic crystal material of the type hereinbefore defined, and preferably of one or more alkali halides exemplified in my above mentioned patent. The screen layer is applied or deposited upon wall portion 12 or a transparent metallic film electrode 16 produced on window 12 in well known manner. A substantially transparent electrode of a mesh of extremely fine wire can be used instead of film electrode 16 which serves mainly to conduct away the charges injected into layer 15 by the electron beam; a suitably high positive potential can be applied to electrode 16 through wire 17 led to the outside through glass seal 18 or in any other manner, for instance be derived from an accelerating electrode on highest potential within the tube by connecting it with the electrode or front face of layer 15 by means of a conductive coating inside enveloped 10.

Upon impingement of screen 15 by a cathode ray beam 19 developed by the electron gun in neck 14 and directed upon a desired screen area, color centers are created in the screen portion covered by that area; the density of the color centers depends on the number of electrons thus injected into the screen, and therefore on the instantaneous current density of beam 19 modulated or controlled by the intelligence to be reproduced. These and other features of constructing and operating a cathode ray tube provided with a light valve screen of certain ionic crystal material is in principle the same as disclosed for instance in my above patent, to which reference is therefore made in all these respects.

Instead of or in addition to utilizing the color or opacity centers thus created for directly modulating visible light transmitted through the screen layer, according to the present invention use is made substantially of the dichroic properties of screen member 15 created therein by illumination with polarized light. To this end, light from a suitable source 20 is projected by means of mirror 21 and condenser lens system 22 through a plane polarizer sheet 23 arranged in front of window 11, so that the plane polarized light emerging from sheet 23 is transmitted through window 11 upon screen layer 15. Whenever and wherever color centers are created in screen 15 by injection of an electron charge from cathode ray stream or beam 19, the incident polarized light causes dichroism proportional to its intensity and the number of color centers simultaneously produced by that electron charge. Presuming that the screen illumination by the first polarized light derived from source 20 is constant, the local intensities of the injected electron charges will determine the degree of dichroism created which therefore is proportional to the local current density of the impinging beam as controlled by intelligence instantaneously to be reproduced.

In order to make visible the dichroism thus locally created in any portion of screen layer 15, screen 15 is illuminated by other polarized light incident upon it at an angle different from that of the first mentioned polarized light. To this effect, a light source, such as, for instance, an arc lamp 24 is arranged in front of and outside window 12, and its light is projected by mirror 25 and condenser lens system 26, through plane polarizer sheet 27 (preferably of the same material as sheets 23) and window 12 upon screen layer 15. The condenser lens system and polarizer sheet should be arranged close to window 12.

The effect of the dichroism created by the polarized light from source 20 in the manner described in portions of screen layer 15, upon non-polarized light incident thereon would consist in that the latter is divided into two components polarized perpendicularly to one another, and one component transmitted in appreciable amount whereas the other component is practically absorbed. By the use according to the invention of plane polarized light derived from source 24 the direction of polarization of which coincides with the polarizing direction of strongly absorbed light of dichroic layer 15, this second polarized light from source 24 will be more or less absorbed by screen portions in which color centers are created in larger or smaller numbers by the impinging cathode ray beam depending on its instantaneous local intensity, causing dichroism of corresponding degree. Other screen portions, however, in which no color centers have been created due, for instance, to zero beam intensity or because the beam has not been directed upon the screen areas covering those portions, will transmit the incident second polarized light.

Screen 15 is imaged through window 13 and by projection lens system 28 onto a projection screen 29, on which therefore portions of screen 15 in which no dichroism has been created appear at full brightness, whereas screen portions in which electron charges of greatest density have been injected due to maximum beam current and which therefore exhibit dichroism of highest degree, appear darkest; screen portions in which electron charges of intermediate densities have been injected due to intermediate beam current intensities and which therefore exhibit intermediate degrees of dichroism, appear at corresponding intermediate brightness.

A light valve of this type can be used for visible reproduction of intelligence of any kind, such as lines, traces, etc. and pictures. In particular, such light valve can be used for reproducing televised intelligence and specifically pictures. It is desirable particularly in the latter case that the brightness values of the image appearing on projection screen 29 be proportional to the brightness values of the televised picture. Therefore, greatest brightness values of the televised picture must result in smallest or zero beam current intensities, and vice versa; in other words, a so-called negative beam current modulation method is to be used. In general, in the visible reproduction of relative brightness values controlling the beam current intensities in a light valve according to the invention, these intensities should be in inverse relation to the actual brightness values to be reproduced.

As explained, for instance, in my above mentioned patent, electron charges injected in a screen portion by an impinging or scanning cathode ray beam, are moved toward electrode 16 where they disappear, and the time period required for this motion can be controlled. While these electron charges travel through a portion of screen layer 15 and are not yet dissipated, there will be created simultaneously and therefore persist in that portion the above described dichroism effect caused by the illumination of the screen with polarized light derived from source 20, whereby a desirable storage effect is obtained, for instance with television reception over a frame scanning period or a major part thereof.

In order to adjust the optimum relative orientation of the two flows of polarized light derived from sources 20, 24 with respect to one another and screen 15, at least one of the polarizers 23, 27 can be arranged rotatable in its own plane, and by its rotation optimum contrast effects in the screen image projected onto projection screen 29 ascertained; the polarizer is then to be fixed in that position.

In cases in which a negative control method of beam current intensities is undesirable, the reverse control or scanning method as explained, for instance, in my above patent can be used. Accordingly high beam intensities are used and controlled or modulated within a range above a minimum level which results in what I compared in my patent with "solarisation" effects. They are based on the fact that the number or densities of color centers previosuly created in a screen portion may decrease by scanning this portion with a cathode ray beam of suitable intensity. In such case, therefore, the absorption of properly oriented polarized light from source 24 due to the created dichroism will be the less, the higher the intensity of the impinging cathode ray beam is, and the local brightness values of the image of screen 15 formed on projection screen 29 will be substantially proportional to the beam current intensities, corresponding to a positive control method.

In the just described embodiment of the invention, the polarized light from light source 20 is used to cause the dichroism, and the polarized light from light source 24 is used to make this dichroism visible. According to the further invention, light source 20 and polarizer 23 can be omitted in certain cases. The light from light source 24 polarized by polarizing screen 27 will cause dichroism in the portions of screen 15 in which color centers have been produced by the cathode-ray beam 19 in the same way as has been explained previously with respect to polarized light from source 20. Depending upon various conditions of operation, such as the material of screen 15 and the nature and density of the color centers created therein, the local dichroism produced can be of such kind that light of the polarization direction of the dichroism producing light, is more strongly absorbed than light polarized perpendicular thereto. Thus the dichroism created by the polarized light from source 24 will act upon light from that source in such a manner that this polarized light is weakened in screen portions exhibiting strong dichroism due to high cathode ray beam intensity. This effect can be compared with that of strong light upon photographic silver chloride emulsions which are darkened thereby, and the thus darkened areas weaken the light producing this darkening. From another aspect the effect of this feature of the invention can be explained as follows: Due to the illumination of screen 15 by polarized light from light source 24, a cathode ray beam 19 scanning the thus illuminated screen can produce dichroism in impinged screen portions proportional to the intensity of the impinging beam. These screen portions are thereby converted into partial polarizers and act as such upon the transmitted polarized light from source 24.

By the use of this feature of the invention, light source 20, mirror 21, condenser lens system 22, polarizing sheet 23 and window 11, Fig. 1, can be omitted, and a tube used of a form similar to tube 1 in Fig. 1 of my above mentioned Patent 2,330,171. A corresponding arrangement is shown schematically and by way of exemplification in Fig. 3 (in which projection lens system 28, Fig. 1, is omitted).

In this case tube envelope 10 is provided with two opposite windows 12, 13 and the ionic crystal layer 15 arranged inside and close to window 12. The light from source 24 is projected by mirror 25 through condenser lens system 26, polarizer sheet 27 and window 12 upon layer 15 and hence through window 13 and a projection lens system (not shown) onto screen 29. By turning sheet 27 in its plane, optimum effects can be established.

As has been explained in the above mentioned Patent 2,330,171, the color centers created by an electron beam in the material of screen 15 can be used for modulating visible light projected therethrough onto viewing screen 29. In cases of certain materials or applications, for instance, where these opacity values do not create a desired deep black at local areas of projection screen 29 or sufficient contrast, the feature described with reference to Fig. 3 can be used in order to deepen the black and/or to increase the picture contrast. As explained hereinbefore, portions of screen 15 in which a great number of color centers are created exhibit a high degree of opacity; by arranging polarizer sheet 27 between the light source and screen 15, also dichroism of high degree is produced in such portions which weakens the polarized light from source 24 and adds to the light absorption by the color centers, so that the resulting picture black and contrast values are increased. Thus the dichroic effects produced by the present invention can be utilized to improve in certain cases the effects as described in the above patent, as well as in all the embodiments of the present invention.

Similarly, a reflecting arrangement corresponding to Fig. 2 of that patent can be used for instance in the manner shown schematically in Fig. 4. There layer 15 and transparent electrode 16 are arranged on and inside window 30, and another electrode 31 (corresponding to electrode 16 in Fig. 2 of said patent) behind it which is permeable for electrons and light reflecting or scattering on its surface facing layer 15. Electrode 31 may be connected, if so desired, through lead 32 with a positive potential lower than that of electrode 16, in the manner and for the purpose described in said patent. Light source 20 is arranged for illumination of layer 15, and a polarizing sheet 23 is inserted between the light source and layer 15 for causing dichroism in portions of the latter impinged by the cathode ray beam. The polarized light from source 20 which is not absorbed in layer 15 due to the dichroism locally created therein (and the color or opacity centers, as the case may be) is reflected by electrode 31 and transmitted through layer 15 and window 30 to the outside. The screen layer in which the desired intelligence is thus visibly reproduced, can be viewed directly by an observer in front of window 30. By turning sheet 23 in its plane, optimum effects can be established.

Instead of using light of linear polarization in the embodiments of the invention herein described, light of circular or elliptical polarization can be used in certain cases.

Figure 7:
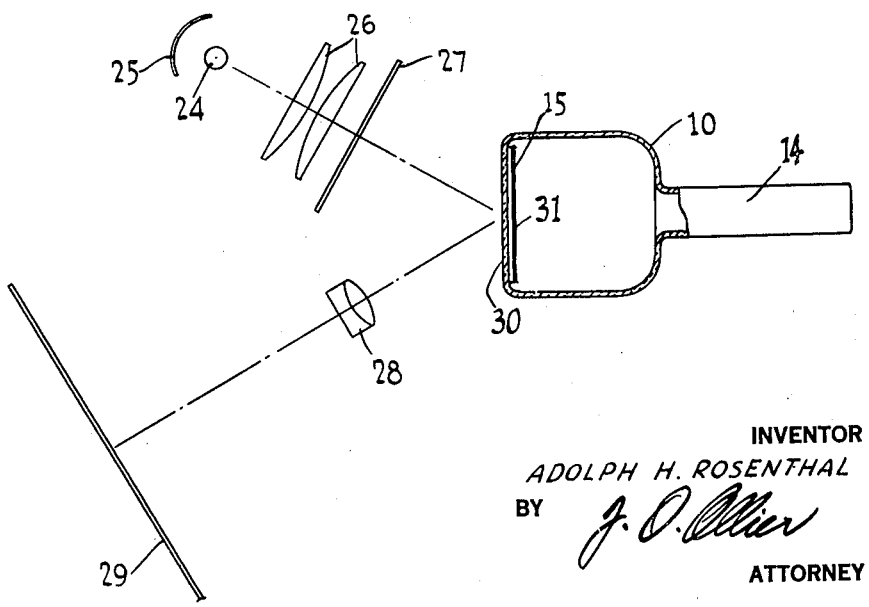

A light reflecting arrangement on similar principle is illustrated schematically in Figure 7. Tube envelope 10 is provided with a window 30 and an ionic crystal layer 15 with backing 31 of light reflecting or scattering properties are arranged inside the window. Light from source 24 is projected by mirror 25 through condenser lens system 26, polarizer sheet 27 and window 30 upon layer 15, causing therein locally dichroism of a degree depending upon the number of color centers created locally in portions of that layer by the impinging cathode ray beam permeating backing 31. The polarized light thus incident upon layer 15 is therefore more or less absorbed locally by portions of that layer in which color centers are created, due to that dichroism as well as those color centers, and otherwise reflected by backing 31 and transmitted through layer 15, window 30 and projected by the projection lens system 28 onto the projection screen 29 where an image is formed of layer 15. Again, by turning polarizer sheet 27 in its plane, optimum effects can be established.

Another reflecting arrangement according to the invention is illustrated in Fig. 5. A spherical mirror 37 with inserted projection lens 36 is arranged in front of window 30 of evacuated tube 10, inside of which ionic crystal layer 15 provided with a backing 31 of light reflecting or scattering properties and permeable by cathode rays is arranged. Light from source 24 is projected by mirror 25 through polarized sheet 27, lens 36 and window 30 upon layer 15 and causes dichroism locally in portions affected by the cathode ray beam. Light directed upon portions of layer 15 in which color centers and consequential dichroism are not or only to lesser degree created, is transmitted to the reflecting backing 31 and reflected by it through layer 15 and window 30 upon mirror 37 and hence projected through a Smith aspherical lens 32 onto projection screen 29. By turning polarizer sheet 27 in its plane, optimum effects according to the invention can be obtained.

In the arrangement illustrated in Fig. 6, a tube 10 of similar construction as shown in Fig. 1 is used. Light from source 20 is projected by mirror 21 through lens 22, polarizer sheet 23 and window 11 upon the ionic crystal layer 15 and causes in portions of the latter impinged by the cathode ray beam, dichroism of a degree depending on the intensity of the impinging beam. Light from source 24 is projected by mirror 25 through condenser lens system 26, polarizer sheet 27 and window 12 upon crystal layer 15 and illuminates the latter. Depending on the number of color centers locally created in the ionic crystal layer and consequential dichroism caused by the first polarized light incident from source 20 through polarizer sheet 23, the second polarized light emerging from sheet 27 will be either absorbed by or illuminate more or less portions of layer 15. The illuminated portions of that layer are imaged by projection lens system 28 onto screen 29.

It should be understood that the invention is not limited to any of the exemplifications hereinbefore described and shown in the drawing but is to be derived in its broadest aspects from the appended claims. Thus, for instance, electrode 16 can be omitted particularly if other means are provided for removing color or opacity centers created locally in layer 15 by an impinging cathode ray beam, as exemplified in my above patent. Layer 15 can then be applied to or deposited on the inside of wall 12, or another carrier, such as a transparent film, inside or outside tube 10 which in the latter case is to be provided in per se known manner with a Lenard window through which the cathode ray beam can pass. The invention is applicable, for instance, for television reproducers or receivers, indicators of curves, traces and other information, such as oscillographs, radio location devices, etc.

What I claim is:

1. The combination for visibly reproducing electric signals representative of intelligence impressed upon a cathode ray beam, including a screen layer essentially consisting of ionic crystal material of the type in which the injection of cathode rays can create color centers which upon illumination with polarized light cause dichroism, a first source of polarized light for producing dichroism in portions of said layer when impinged by cathode rays, the degree of said dichroism depending on the intensity of the impinging cathode rays, and a second source of polarized light for illuminating said layer so that polarized light from said second source is absorbed by portions of said layer in which dichroism is produced, the extent of said absorption depending on the degree of said dichroism.

2. The combination for visibly reproducing electric signals representative of intelligence impressed upon a cathode ray beam, including an evacuated envelope provided with three windows, a layer essentially consisting of ionic crystal material of the type in which the injection of cathode rays can create color centers which upon illumination with polarized light cause dichroism, said layer arranged inside said envelope and close to the first of said windows, means for developing and directing a cathode ray beam upon said layer arranged within said envelope, a source of polarized light arranged outside said envelope in front of the second of said windows so that said polarized light is transmitted through said second window upon said layer and causes dichroism in portions thereof impinged by said cathode ray beam, the degree of said dichroism depending on the intensity of said cathode ray beam, and a second source of polarized light arranged outside said envelope in front of said first window so that the polarized light from said second source can be transmitted through said first window, layer and third of said windows except where it is absorbed by portions of said layer wherein said dichroism is produced, the extent of said absorption depending on the degree of said dichroism.

3. The combination for visibly reproducing electric signals representative of intelligence impressed upon a cathode ray beam, including an evacuated envelope provided with two opposite windows, a screen layer inside said envelope close to the first of said windows, said screen layer essentially consisting of ionic crystal material of the type in which the injection of cathode rays can create color centers which upon illumination with polarized light cause dichroism, means for developing and directing a cathode ray beam upon said layer arranged within said envelope, and a sheet of polarizing material in front of said first window, so that visible light transmitted through said polarizing sheet and said first window causes dichroism in portions of said layer impinged by the cathode ray beam, the degree of said dichroism and consequent absorption of incident polarized light depending on the intensity of the impinging beam, and said polarized light being transmitted by said layer through the second of said windows except for polarized light absorbed by portions of said layer in which said dichroism is produced.

4. The combination for visibly producing electric signals representative of intelligence impressed upon a cathode ray beam, including an evacuated envelope provided with two opposite windows, a screen layer inside said envelope close to the first of said windows, said screen layer essentially consisting of ionic crystal material of the type in which the injection of cathode rays can create color centers which upon illumination with polarized light cause dichroism, means for developing and directing a cathode ray beam upon said layer arranged within said envelope, a sheet of polarizing material outside said envelope in front of said first window and a source of light in front of said sheet, so that light from said source is polarized by said sheet and the thus polarized light is transmitted through said first window upon said layer producing dichroism in portions thereof impinged by said cathode ray beam, the degree of said dichroism depending on the intensity of said impinging beam, and said polarized light being absorbed by portions of said screen to an extent depending on the degree of said dichroism and otherwise transmitted through the second of said windows.

5. The combination as set forth in claim 4, including optical means for projecting the polarized light transmitted through said second window upon a viewing screen in front of said second window.

6. The combination for visibly reproducing electric signals representative of intelligence impressed upon a cathode ray beam, including an evacuated envelope provided with two windows, a screen layer inside said envelope close to the first of said windows, said screen layer essentially consisting of ionic crystal material in which the injection of cathode rays can create color centers which upon illumination with polarized light cause dichroism, means for developing and directing a cathode ray beam upon said layer arranged within said envelope, a first source of polarized light arranged outside said envelope in front of the second of said windows so that polarized light transmitted through said second window impinges said crystal layer and causes dichroism in portions thereof impinged by said cathode ray beam, the degree of said dichroism depending on the intensity of said beam, a second source of polarized light arranged outside said envelope in front of said first window to illuminate said crystal layer through said first window, and optical means arranged in front of said first window for imaging said crystal layer upon a projection screen.

7. The combination as set forth in claim 6, in which said first and second sources of polarized light each comprises a source of light and a sheet of polarizing material between said light source and the co-ordinated second and first windows, respectively.

8. The combination for visibly reproducing electric signals representative of intelligence impressed upon a cathode ray beam, including an evacuated envelope provided with at least two windows, a screen layer inside the envelope close to the first of said windows, said screen layer essentially consisting of ionic crystal material in which the injection of cathode rays can create color centers which upon illumination with polarized light produce dichroism, a first source of light outside said envelope in front of the second of said windows, a sheet of polarizing material between said light source and said second window, a second source of light outside the envelope in front of said first window, and a sheet of polarizing material between said second light source and first window, at least one of said sheets being rotatable in its plane.

ADOLPH H. ROSENTHAL.

REFERENCES CITED

The following references are of record in the file of this patent:

UNITED STATES PATENTS

| Number | Name | Date |
|---|---|---|
| 2,163,918 | Schwartz | June 27, 1939 |
| 2,277,008 | Von Ardenne | Mar. 17, 1942 |
| 2,297,443 | Von Ardenne | Sept. 29, 1942 |
| 2,330,171 | Rosenthal | Sept. 21, 1943 |